US012512587B2

(12) United States Patent
Hwang et al.

(10) Patent No.: US 12,512,587 B2
(45) Date of Patent: Dec. 30, 2025

(54) ANTENNA STRUCTURE AND WIRELESS COMMUNICATION DEVICE

(71) Applicant: DELTA ELECTRONICS, INC., Taoyuan (TW)

(72) Inventors: Chieh-Tsao Hwang, Taoyuan (TW); Siang-Rong Hsu, Taoyuan (TW); Yen-Ting Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 713 days.

(21) Appl. No.: 17/929,751

(22) Filed: Sep. 6, 2022

(65) Prior Publication Data

US 2023/0361462 A1 Nov. 9, 2023

(30) Foreign Application Priority Data

May 9, 2022 (CN) ........................ 202210498484.1

(51) Int. Cl.
*H01Q 3/26* (2006.01)
*H01Q 3/28* (2006.01)
(Continued)

(52) U.S. Cl.
CPC ................ *H01Q 3/26* (2013.01); *H01Q 3/28* (2013.01); *H01Q 3/30* (2013.01); *H01Q 3/32* (2013.01);
(Continued)

(58) Field of Classification Search
CPC ...... H01Q 3/26; H01Q 3/2682; H01Q 3/2694; H01Q 3/28; H01Q 3/30-32; H01Q 21/22; H01Q 21/0006; H01Q 21/065
See application file for complete search history.

(56) References Cited

U.S. PATENT DOCUMENTS 4,973,972 A * 11/1990 Huang .................. H01Q 1/523 333/26
5,973,641 A * 10/1999 Smith .................... H01Q 21/22 342/372
(Continued)

FOREIGN PATENT DOCUMENTS

CN 111370862 A 7/2020
CN 111725630 A 9/2020
(Continued)

OTHER PUBLICATIONS

Tiago Varum et. al., "Nonuniform Broadband Circularly Polarized Antenna Array for Vehicular Communications", IEEE Transactions on Vehicular Technology, Sep. 2016, vol. 65. No. 9.

*Primary Examiner* — Ab Salam Alkassim, Jr.
(74) *Attorney, Agent, or Firm* — CKC & Partners Co., LLC

(57) ABSTRACT

An antenna structure is provided, which includes a substrate, a ground layer, a multi-branch circuit, and multiple antenna elements. The substrate includes a first surface and a second surface. The ground layer is disposed between the first surface and the second surface. The multi-branch circuit is disposed on the first surface, wherein the multi-branch circuit includes a signal feeding terminal and multiple signal output terminals, wherein multiple feeding branches are formed between the signal feeding terminal and the multiple signal output terminals. The multiple antenna elements is disposed on the second surface, wherein the multiple antenna elements are connected to the multiple signal output terminals through respective via holes, and are configured for beamforming, wherein a length difference between path lengths of the feed branches of two adjacent antenna elements in a horizontal direction is configured for controlling a beam angle of the multiple antenna elements.

19 Claims, 9 Drawing Sheets

(51) Int. Cl.
*H01Q 3/30* (2006.01)
*H01Q 3/32* (2006.01)
*H01Q 9/04* (2006.01)
*H01Q 21/00* (2006.01)
*H01Q 21/06* (2006.01)
*H01Q 21/22* (2006.01)

(52) U.S. Cl.
CPC ......... *H01Q 9/045* (2013.01); *H01Q 21/0006* (2013.01); *H01Q 21/22* (2013.01); *H01Q 21/065* (2013.01)

(56) References Cited

U.S. PATENT DOCUMENTS

| | | | | |
|---|---|---|---|---|
| 6,184,828 | B1 * | 2/2001 | Shoki | H01Q 3/26 342/372 |
| 6,417,806 | B1 | 7/2002 | Gothard et al. | |
| 7,839,350 | B2 * | 11/2010 | Nagai | H01Q 9/045 343/851 |
| 9,395,727 | B1 * | 7/2016 | Smith | G01S 7/03 |
| 10,062,972 | B1 * | 8/2018 | Strassner | H01Q 21/065 |
| 10,074,910 | B1 * | 9/2018 | Buckley | H01Q 1/38 |
| 11,749,881 | B2 | 9/2023 | Hou et al. | |
| 2004/0100402 | A1 * | 5/2004 | McCandless | H01Q 21/22 342/368 |
| 2004/0150568 | A1 | 8/2004 | Chiang et al. | |
| 2008/0036662 | A1 * | 2/2008 | Iwata | H01Q 9/0407 343/700 MS |
| 2010/0295743 | A1 | 11/2010 | Pu et al. | |
| 2012/0086601 | A1 * | 4/2012 | Lee | H01Q 3/30 342/372 |
| 2013/0090076 | A1 | 4/2013 | Teillet et al. | |
| 2013/0116011 | A1 | 5/2013 | Lee et al. | |
| 2016/0156109 | A1 * | 6/2016 | Anderson | H01Q 21/062 29/601 |
| 2017/0180064 | A1 | 6/2017 | Su et al. | |
| 2018/0241135 | A1 * | 8/2018 | Furlan | H01Q 21/0075 |
| 2018/0278219 | A1 | 9/2018 | Abe | |
| 2018/0309210 | A1 * | 10/2018 | Sudo | H01Q 3/24 |
| 2019/0033428 | A1 | 1/2019 | Rowell et al. | |
| 2019/0252755 | A1 * | 8/2019 | Shamsinejad | H01P 5/19 |
| 2019/0393616 | A1 * | 12/2019 | Pelletti | H01Q 21/065 |
| 2020/0227821 | A1 | 7/2020 | Wu et al. | |
| 2020/0227835 | A1 * | 7/2020 | Kim | H01Q 21/065 |
| 2020/0303811 | A1 * | 9/2020 | Saito | H01Q 1/288 |
| 2020/0389800 | A1 | 12/2020 | Laghate et al. | |
| 2020/0411950 | A1 * | 12/2020 | Kuroda | H01Q 1/2283 |
| 2021/0250079 | A1 * | 8/2021 | Ariumi | H04B 7/10 |
| 2021/0305718 | A1 | 9/2021 | Li et al. | |
| 2022/0302603 | A1 * | 9/2022 | Chieh | H01Q 21/0075 |
| 2022/0416435 | A1 * | 12/2022 | Liu | H01Q 21/0025 |
| 2023/0179237 | A1 * | 6/2023 | Torres | H04B 1/02 455/552.1 |
| 2024/0072434 | A1 * | 2/2024 | Braun | H01Q 21/24 |
| 2024/0195481 | A1 * | 6/2024 | Hwang | H04B 7/0695 |
| 2024/0258705 | A1 * | 8/2024 | Ding | H01Q 21/08 |

FOREIGN PATENT DOCUMENTS

| | | | | | |
|---|---|---|---|---|---|
| CN | 112201952 | A | * | 1/2021 | H01Q 1/36 |
| CN | 113013567 | A | | 6/2021 | |
| CN | 113270730 | A | | 8/2021 | |
| CN | 119153962 | A | * | 12/2024 | H01Q 1/08 |
| EP | 0493014 | A1 | * | 7/1992 | H01Q 21/065 |
| EP | 1657783 | B1 | * | 8/2007 | H01Q 3/36 |
| JP | 02164107 | A | * | 6/1990 | |
| JP | H02164107 | A | | 6/1990 | |
| JP | H0897620 | A | | 4/1996 | |
| JP | H10303612 | A | | 11/1998 | |
| JP | H11266118 | A | | 9/1999 | |
| JP | 2004245602 | A | * | 9/2004 | H01Q 3/24 |
| JP | 2018186337 | A | | 11/2018 | |
| TW | 201401655 | A | | 1/2014 | |
| TW | I706598 | B | | 10/2020 | |
| WO | WO-0159473 | A2 | * | 8/2001 | H01Q 21/065 |

* cited by examiner

ANTENNA STRUCTURE AND WIRELESS COMMUNICATION DEVICE

CROSS-REFERENCE TO RELATED APPLICATION

This application claims priority to Chinese Application Serial Number 202210498484.1, filed May 9, 2022, which is herein incorporated by reference in its entirety.

BACKGROUND

Field of Disclosure

The present disclosure relates to a technology of a fifth generation new radio (5G NR), and more particularly, to an antenna structure and wireless communication device.

Description of Related Art

In a fifth-generation new radio (5G NR) millimeter wave (mmWave) antenna array, a beamforming method is often used in the antenna array to transmit various signals. However, when the antenna array with a large quantity of antenna elements is installed in a small space and there are a large quantity of users, it is necessary to transmit a large quantity of beams in a small space. This often results in difficult beam angle control, inter-beam interference, sidelobe interference, high power consumption, and high cost.

SUMMARY

The disclosure provides an antenna structure, which comprises a substrate, a ground layer, a multi-branch circuit, and a plurality of antenna elements. The substrate comprises a first surface and a second surface. The ground layer is disposed between the first surface and the second surface. The multi-branch circuit is disposed on the first surface, wherein the multi-branch circuit comprises a signal feeding terminal and a plurality of signal output terminals, wherein a plurality of feeding branches are formed between the signal feeding terminal and the plurality of signal output terminals. The plurality of antenna elements is disposed on the second surface, wherein the plurality of antenna elements are connected to the plurality of signal output terminals through respective via holes, and are configured for beamforming, wherein a length difference between path lengths of the feed branches of two adjacent antenna elements in a horizontal direction is configured for controlling a beam angle of the plurality of antenna elements.

The disclosure provides a wireless communication device, which comprises a plurality of antenna arrays, wherein each of the plurality of antenna arrays comprises a substrate, a ground layer, a multi-branch circuit, and a plurality of antenna elements. The substrate comprises a first surface and a second surface. The ground layer is disposed between the first surface and the second surface. The multi-branch circuit is disposed on the first surface, wherein the multi-branch circuit comprises a signal feeding terminal and a plurality of signal output terminals, wherein a plurality of feeding branches are formed between the signal feeding terminal and the plurality of signal output terminals. The plurality of antenna elements is disposed on the second surface, wherein the plurality of antenna elements are connected to the plurality of signal output terminals through respective via holes, and are configured for beamforming, wherein a length difference between path lengths of the feed branches of two adjacent antenna elements in a horizontal direction is configured for controlling a beam angle of the plurality of antenna elements.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
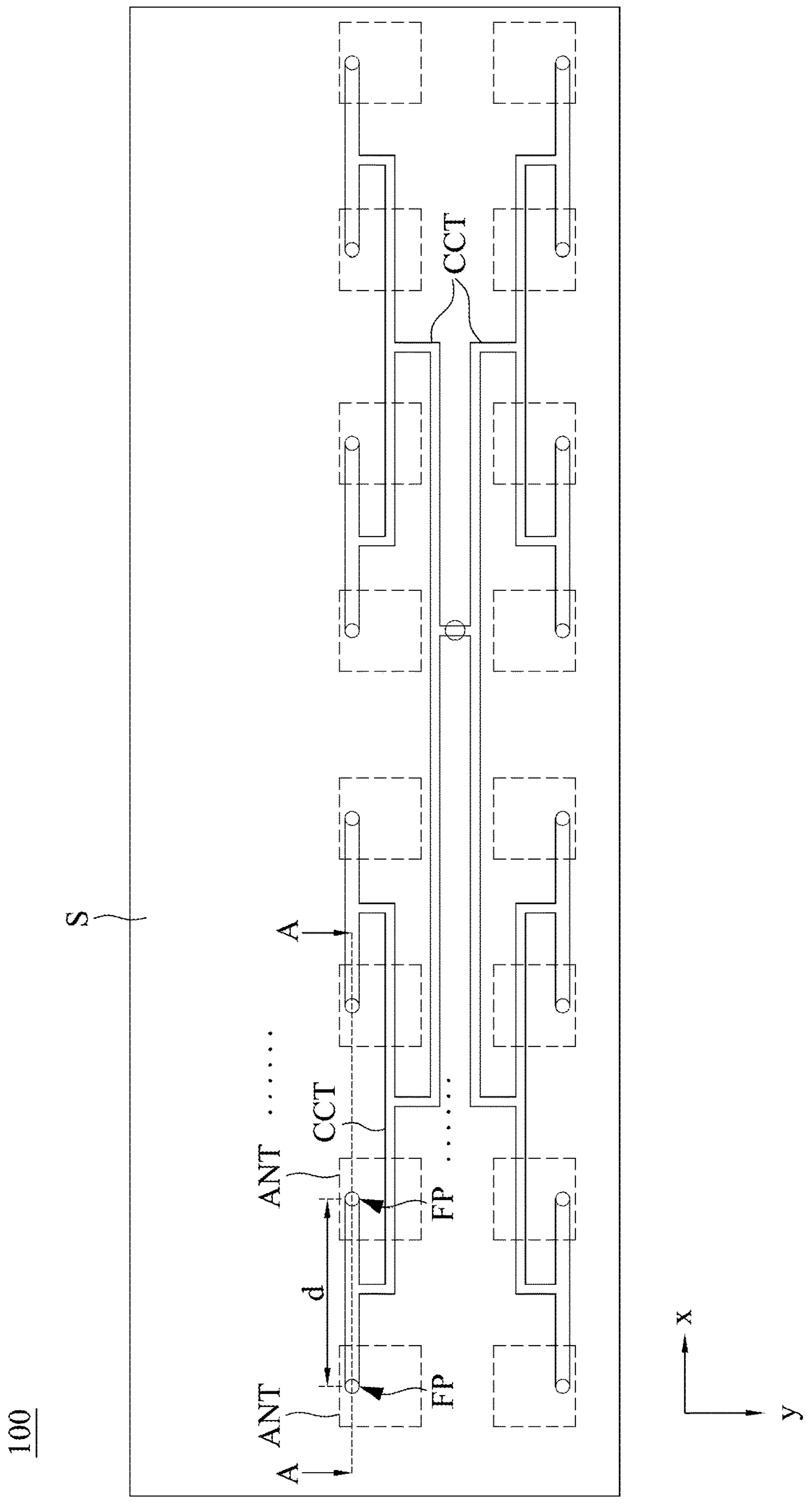
FIG. 1 is a top perspective view of a wireless communication device of the present disclosure.

Reference will now be made in detail to the present embodiments of the disclosure, examples of which are illustrated in the accompanying drawings. Wherever possible, the same reference numbers are used in the drawings and the description to refer to the same or like parts.

Figure 2:
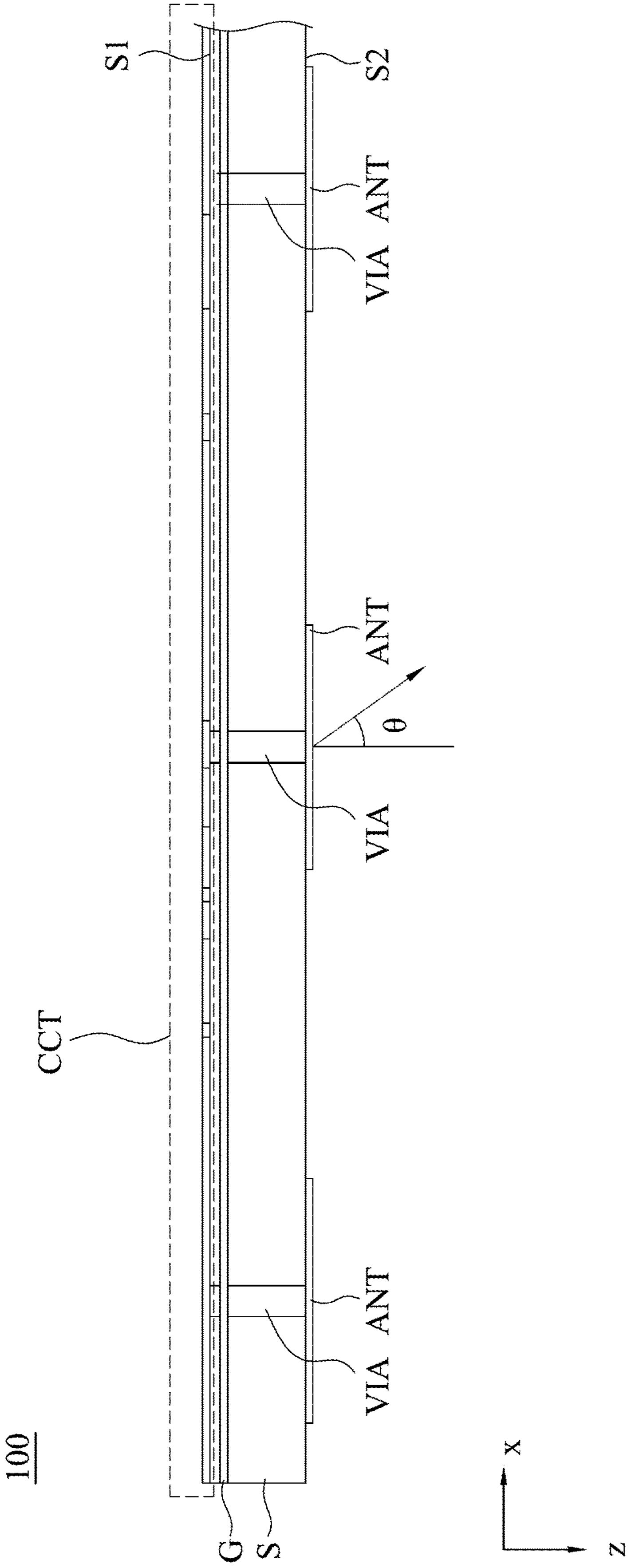
FIG. 2 is a side perspective view of the wireless communication device of the present disclosure.

Refer to FIG. 1 and FIG. 2, where FIG. 1 is a top perspective view of a wireless communication device 100 of the present disclosure, and FIG. 2 is a side perspective view of the wireless communication device 100 of the present disclosure, where FIG. 2 is the side perspective view along a line segment from terminal point A to terminal point A in the wireless communication device 100 of FIG. 1. In this embodiment, the wireless communication device 100 includes a substrate S, a ground layer G, a multi-branch circuit CCT, and multiple antenna elements ANT.

Notably, although this embodiment adopts a configuration in which a quantity of the multiple antenna elements ANT is 16 and the quantity of each row of the multiple antenna elements ANT is 8, to achieve requirement that a beamwidth is 11 degrees and antenna gain of a main beam needs to be more than or equal to 15 dB, the quantity of the multiple antenna elements ANT and the quantity of each row can also be adjusted according to other requirements of beamwidth and antenna gain.

Furthermore, the substrate S includes a first surface S1 and a second surface S2 corresponding to each other. The ground layer G is disposed between the first surface S1 and the second surface S2. In some embodiments, the substrate S can be a printed circuit board (PCB) made of an insulating material, where material of the substrate S can be Teflon (PTFE) or epoxy resin (FR4) and other materials commonly used to manufacture PCBs. In some embodiments, the ground layer G can be made of a metal material such as copper foil.

Furthermore, the multi-branch circuit CCT is disposed on the first surface S1, where the multi-branch circuit CCT includes a signal feeding terminal and multiple signal output terminals, where the multiple feeding branches are formed between the signal feeding terminal and the multiple signal output terminals. In some embodiments, the multi-branch circuit has multiple branch nodes in multiple stages to form the multiple feeding branches between the signal feeding terminal and the multiple signal output terminals.

In some embodiments, the multiple branch nodes can be multiple unequal Wilkinson power dividers, and the multiple unequal Wilkinson power dividers are used for improving isolation between the multiple antenna elements ANT to control antenna gain of the multiple antenna elements ANT, thereby reducing sidelobe interference. In some embodiments, the multiple unequal Wilkinson power dividers are further used for controlling the antenna gain of the multiple antenna elements ANT by controlling the multiple power ratios between the multiple antenna elements ANT.

Furthermore, the multiple antenna elements ANT are disposed on the second surface S2, where the multiple antenna elements are connected to the multiple signal output terminals through respective via holes VIA, and are configured for beamforming. In some embodiments, a feeding point FP of each antenna elements ANT can be connected to corresponding signal output terminal through the corresponding via hole VIA.

Furthermore, a length difference between path lengths of the feeding branches of two adjacent antenna elements in a horizontal direction (i.e., +x direction) is configured for controlling a beam angle θ of the multiple antenna elements (i.e., an angle between directions of a generated beam of the multiple antenna elements ANT and a normal direction of the second surface S2). In some embodiments, the antenna element ANT can be a patch antenna or other antennas applicable to an antenna array. In other words, the multiple antenna elements ANT can form one or more antenna arrays, where the antenna arrays can be patch antenna arrays.

In some embodiments, when each of the multiple antenna elements ANT is a vertically polarized patch antenna, the multiple antenna elements ANT are disposed on the second surface S2 in a horizontal mirror plane from row to row. In addition, when each of the multiple antenna elements ANT is a horizontally polarized patch antenna, the multiple antenna elements ANT are disposed on the second surface S2 in a vertical mirror plane from column to column.

In some embodiments, a phase difference between two adjacent antenna elements ANT in the horizontal direction is proportional to the length difference. In some embodiments, the beam angle θ of the multiple antenna elements ANT is proportional to the length difference. In some embodiments, an antenna distance d between geometric center positions of the adjacent two of the multiple antenna elements ANT in the horizontal direction is one-half wavelength of a center frequency of a resonant frequency band of the multiple antenna elements ANT.

With the wireless communication device 100 of the present disclosure, the beam direction of the wireless communication device 100 can be adjusted by using the path lengths of the feeding branches in the multi-branch circuit CCT. In addition, since the wireless communication device 100 adopts a large quantity of the antenna elements, the beamwidth of the main beam can also be greatly reduced, so as to solve the inter-beam interference caused by the need to use multiple beams in a small space.

The wireless communication device 100 is further described below with an actual example.

Figure 3:
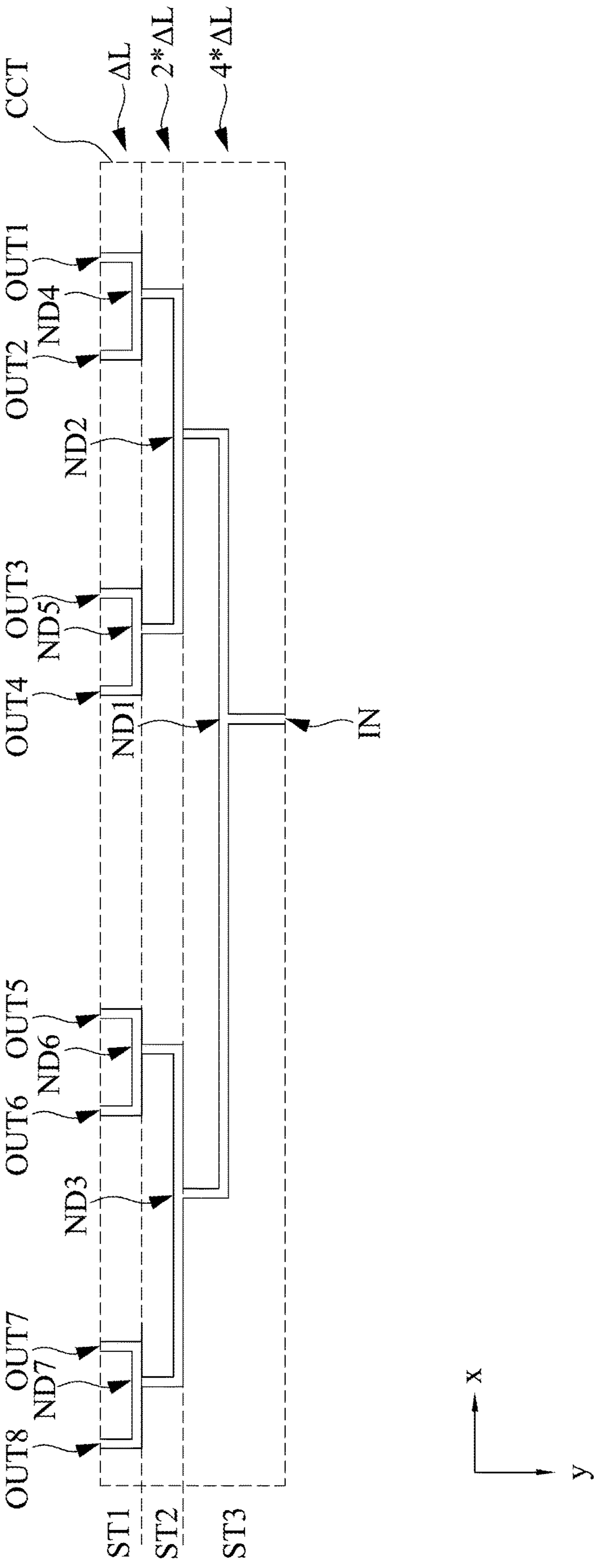
FIG. 3 is a plot of a part of a multi-branch circuit according to some embodiments of the present disclosure.

Refer to FIG. 3, and FIG. 3 is a plot of a part of a multi-branch circuit CCT according to some embodiments of the present disclosure, where the part of the multi-branch circuit CCT is upper half of the multi-branch circuit CCT in FIG. 1. As shown in FIG. 3, the part of the multi-branch circuit CCT includes a signal feeding terminal IN and 8 signal output terminals OUT1~OUT8, and seven branch nodes ND1 to ND7 of three stages ST1 to ST3 exist between the signal feeding terminal IN and the signal output terminals OUT1 to OUT8 to form multiple feeding branches.

Further, the first feeding branch can be formed from the signal feeding terminal IN through the branch nodes ND1, ND2 and ND4 to the signal output terminal OUT1 in sequence. A second feeding branch can be formed from the signal feeding terminal IN through the branch nodes ND1, ND2 and ND4 to the signal output terminal OUT2 in sequence. By analogy, the third to eighth feeding branches can be formed between the signal feeding terminal IN and the signal output terminals OUT3 to OUT8.

On the other hand, for the stage ST1, the length difference between the path length of the first feeding branch and the path length of the second feeding branch is ΔL, and the length difference between the path length of the second feeding branch and the path length of the third feeding branch is also ΔL. By analogy, the length difference between the path lengths of the other two adjacent feeding branches is also ΔL. In other words, the path lengths of the first to eighth feeding branches can form an arithmetic sequence.

For example, for the stage ST1, the length difference can be calculated from the path length from the branch node ND4 to the signal output terminal OUT1 and the path length from the branch node ND4 to the signal output terminal OUT2, where this difference in length is ΔL. In addition, the length difference can be calculated from the path length from the branch node ND5 to the signal output terminal OUT3 and the path length from the branch node ND5 to the signal output terminal OUT4, where this difference in length is also ΔL. By analogy, the length difference corresponding to the output terminal OUT5 and the output terminal OUT6 and the length difference corresponding to the output terminal OUT7 and the output terminal OUT8 are also ΔL.

Furthermore, for the stage ST2, the path difference between the path length, which is from the signal feeding terminal IN to the branch node ND4 through the branch nodes ND1 and ND2 in sequence, and the path length, which is from the signal feeding terminal IN to the branch node ND5 through the branch nodes ND1 and ND2 in sequence, is double ΔL, and the path difference between the path length, which is from the signal feeding terminal IN to the branch node ND5 through the branch nodes ND1 and ND2 in sequence, and the path length, which is from the signal feeding terminal IN to the branch node ND6 through the branch nodes ND1 and ND3 in sequence, is also double ΔL. By analogy, in the stage ST2, the length difference between the path lengths of other adjacent paths is also double ΔL (also forming an arithmetic progression).

For example, for the stage ST2, the length difference can be calculated from the path length from the branch node ND2 to the branch node ND4 and the path length from the branch node ND2 to the branch node ND5, where this length difference is double ΔL. In addition, the length difference can be calculated from the path length of the branch node ND3 to the branch node ND6 and the path length of the branch node ND3 to the branch node ND7, where the length difference is also double ΔL.

Furthermore, for the stage ST3, the path difference between the path length, which is from the signal feeding terminal IN to the branch node ND2 through the branch node ND1, and the path length, which is from the signal feeding terminal IN to the branch node ND3 through the branch node ND1, is four times ΔL.

For example, for the stage ST3, the length difference can be calculated from the path length from the branch node ND1 to the branch node ND2 and the path length from the branch node ND1 to the branch node ND3, where this length difference is four times ΔL.

In this way, the beam angle θ of the multiple antenna elements ANT can be adjusted by using the value ΔL of the length difference corresponding to the stage ST1 according to requirements of antenna design.

Notably, the phase of output signals of the signal output terminals OUT1 to OUT8 can form another arithmetic sequence. In addition, the phase difference between two adjacent signal output terminals is proportional to the above-mentioned length difference.

With the above arrangement, relationship between the beam angle θ of the multiple antenna elements ANT, the antenna distance d, and the value ΔL of the length difference corresponding to the stage ST1 is shown in the following equation (1).

$$\Delta L = d \times \sin\theta \tag{1}$$

It can be known from Equation (1) that when a larger beam angle θ is required, the lengths of the lines in the multi-branch circuit CCT can be adjusted to generate a larger value ΔL of the length difference. Conversely, when a smaller beam angle θ is required, the lengths of the lines in the multi-branch circuit CCT can be adjusted to produce a smaller value ΔL of the length difference. In other words, the value ΔL of the length difference (which can be any positive number) can be selected according to requirement, and the beam angle of the wireless communication device 100 can be adjusted by using the value ΔL of the length difference, and there is no special limitation on ΔL.

Figure 4:
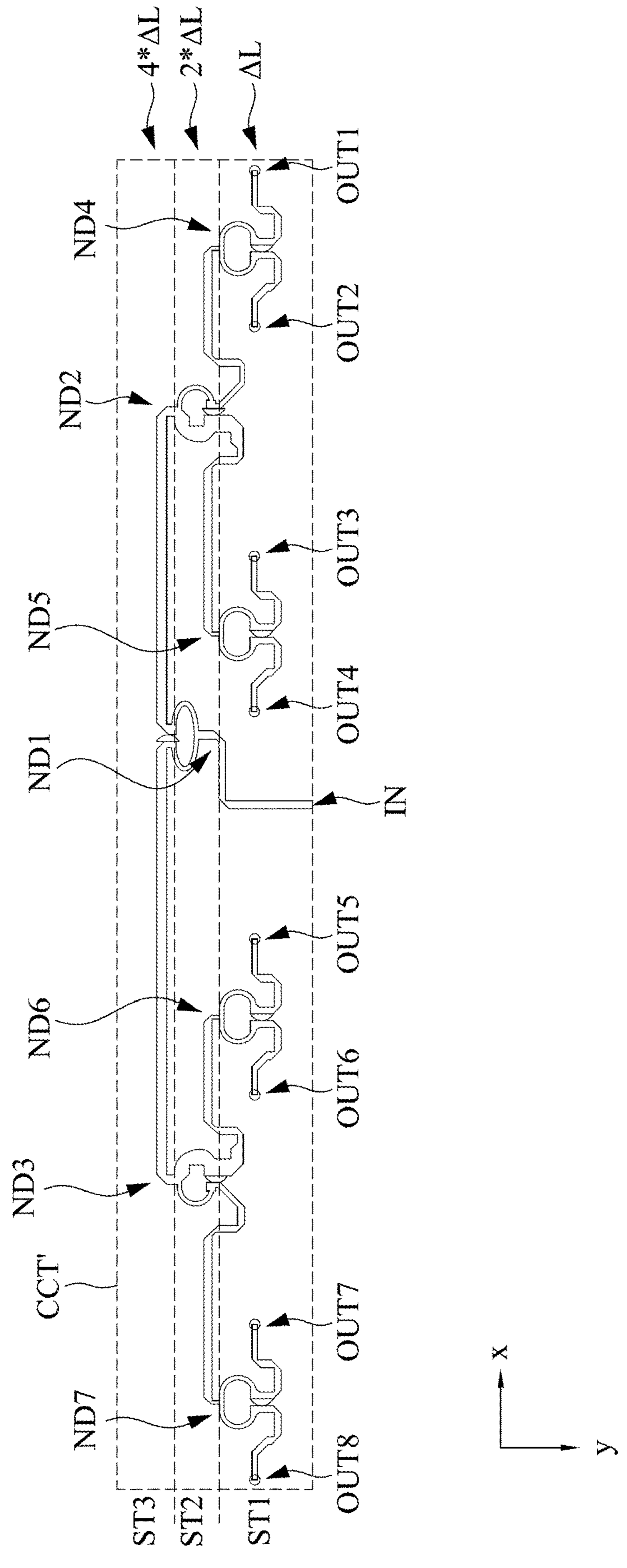
FIG. 4 is a plot of the multi-branch circuit with an unequal Wilkinson power divider according to other embodiments of the present disclosure.

Refer to FIG. 4, and FIG. 4 is a plot of the multi-branch circuit CCT' with an unequal Wilkinson power divider according to other embodiments of the present disclosure. As shown in FIG. 4, each branch node in the multi-branch circuit CCT of FIG. 3 can adopt an unequal Wilkinson power divider to form a circuit structure of a multi-branch circuit CCT' with an unequal Wilkinson power divider, so as to improve the isolation between the two output terminals of the unequal Wilkinson power divider, thereby adjusting the power difference between the two output terminals. Notably, relationship between the path lengths in the stages ST1 to ST3 in the multi-branch circuit CCT' is the same as that of the multi-branch circuit CCT. Therefore, no further description is given here.

In order to set the power difference between the sidelobe and the main beam to be more than or equal to 18 dB, the signal output terminal OUT1 in the multi-branch circuit CCT' can be used as a reference, and power of the signal output terminals OUT1 to OUT8 in the multi-branch circuit CCT' as shown in the following table (1).

| Signal output terminal | OUT1 | OUT2 | OUT3 | OUT4 | OUT5 | OUT6 | OUT7 | OUT8 |
|---|---|---|---|---|---|---|---|---|
| Power (dB) | 0.34 | 0.44 | 0.77 | 1.00 | 1.00 | 0.77 | 0.44 | 0.34 |

It can be known from Table (1) that there is a specific power ratio between the signal output terminals OUT1 to OUT8. Thereby, a power difference between the two output terminals of the unequal Wilkinson power divider in the multi-branch circuit CCT' can be adjusted according to these power ratios.

Furthermore, based on the above Table (1), by using the unequal Wilkinson power divider, the power difference between the two output terminals of the branch node ND4 can be adjusted to 1.12 dB, the power difference between the two output terminals of the branch node ND5 can be adjusted to 1.16 dB, the power difference between the two output terminals of the branch node ND2 can be adjusted to 3.59 dB, and the power difference between the two output terminals of the branch node ND1 can be adjusted to 0 dB. By analogy, the power difference between the two output terminals of branch nodes ND7, ND6 and ND3 can be adjusted in the same way.

With the above arrangement, the power difference between the main beam and the sidelobe of the multiple antenna elements ANT can be increased to more than 18 dB for controlling the antenna gain of the multiple antenna elements ANT to be more than 15 dB, thereby reducing sidelobe interference.

Figure 5:
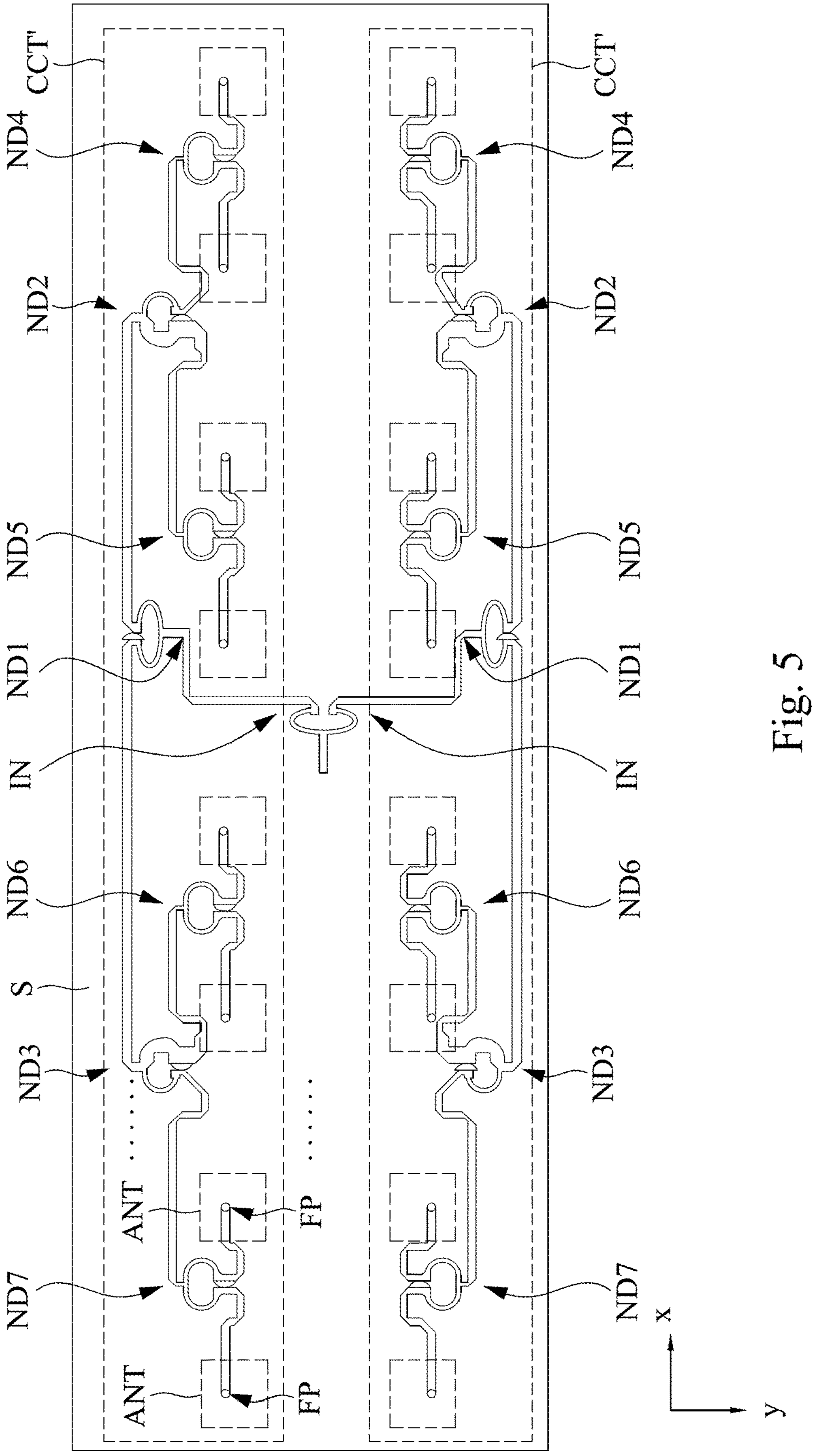
FIG. 5 is a top perspective view of the wireless communication device according to other embodiments of the present disclosure.

Refer to FIG. 5, and FIG. 5 is a top perspective view of the wireless communication device 100 according to other embodiments of the present disclosure. As shown in FIG. 5, the multi-branch circuit CCT' (corresponding to the antenna elements ANT in the first row) in the upper half of the wireless communication device 100 in FIG. 5 is the multi-branch circuit CCT' shown in FIG. 4, and the difference between FIG. 5 and FIG. 1 only lies in the branch nodes ND1 to ND7 in the multi-branch circuit CCT, so other similarities will not be repeated.

Figure 6:
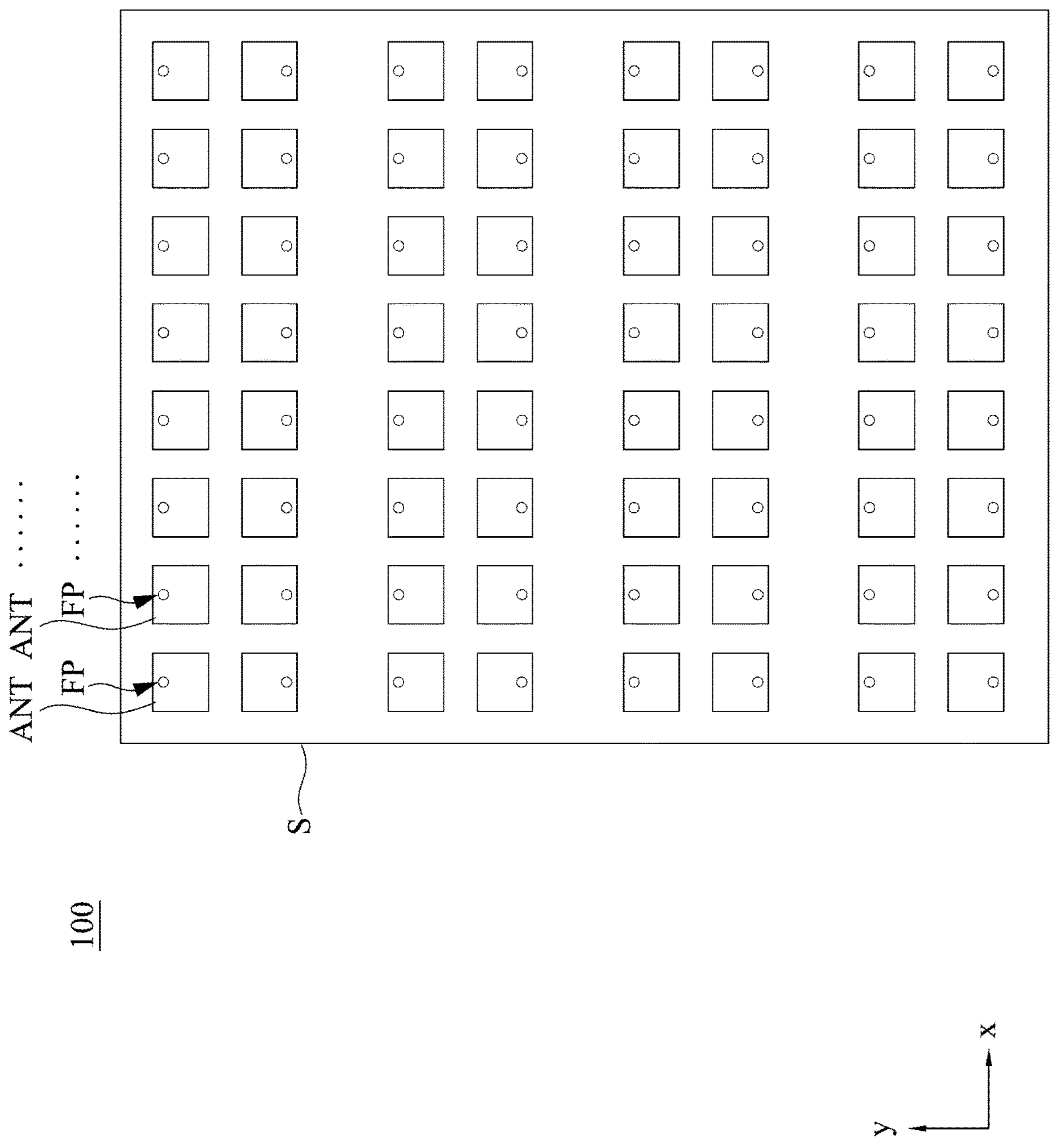
FIG. 6 is a bottom perspective view of the wireless communication device for vertical polarization according to other embodiments of the present disclosure.

Refer to FIG. 6, and FIG. 6 is a bottom perspective view of the wireless communication device 100 for vertical polarization according to other embodiments of the present disclosure. As shown in FIG. 6, the antenna elements ANT in rows 1 to 2 are a vertically polarized antenna array with a beam angle of −5 degrees, the antenna elements ANT in rows 3 to 4 are a vertically polarized antenna array with a beam angle of −16 degrees, the antenna elements ANT in rows 5 to 6 are a vertically polarized antenna array with a beam angle of 5 degrees, and the antenna elements ANT in rows 7 to 8 are a vertically polarized antenna array with a beam angle of 16 degrees.

In addition, with the antenna elements ANT in the first row as a reference, the antenna elements ANT in the second row can be disposed in a horizontal mirror plane from row to row. In other words, the feeding point FP of the antenna element ANT in the first row is close to an upper edge of the antenna element ANT in the first row, and the feeding point FP of the antenna unit ANT in the second row is close to a lower edge of the antenna unit ANT in the second row. By analogy, each antenna array can have the same arrangement.

Figure 7:
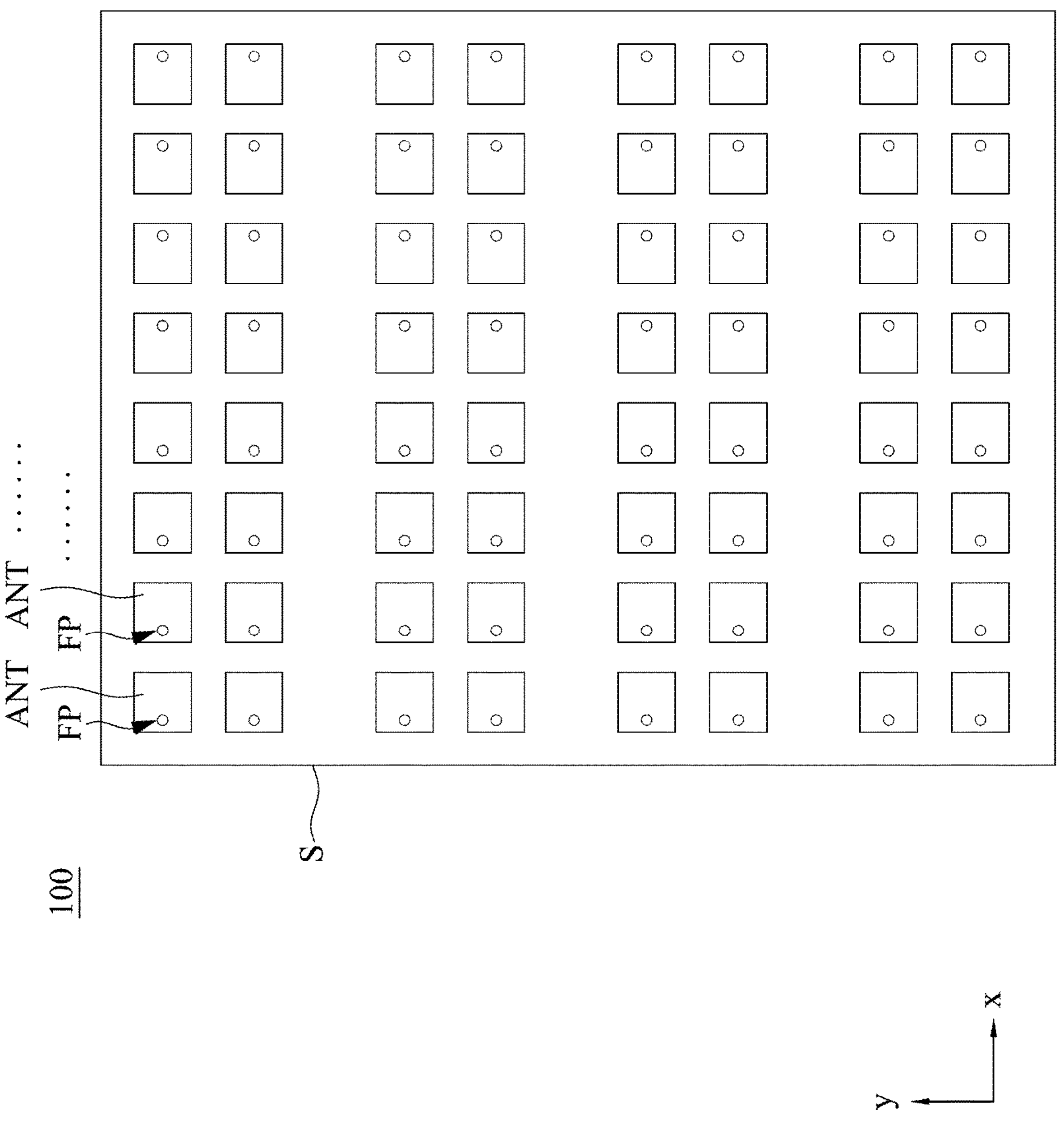
FIG. 7 is a bottom perspective view of the wireless communication device for horizontal polarization according to other embodiments of the present disclosure.

Refer to FIG. 7, and FIG. 7 is a bottom perspective view of the wireless communication device 100 for horizontal polarization according to other embodiments of the present disclosure. As shown in FIG. 7, the antenna elements ANT in rows 1 to 2 are a horizontally polarized antenna array with a beam angle of −5 degrees, the antenna elements ANT in rows 3 to 4 are a horizontally polarized antenna array with a beam angle of −16 degrees, the antenna elements ANT in rows 5 to 6 are a horizontally polarized antenna array with a beam angle of 5 degrees, and the antenna elements ANT in rows 7 to 8 are a horizontally polarized antenna array with a beam angle of 16 degrees.

In addition, with the antenna elements ANT in the columns 1 to 4 as a reference, the antenna elements ANT in the columns 8 to 5 can be disposed in a vertical mirror plane from column to column. In other words, the feeding points FP of the antenna elements ANT in the columns 1 to 4 are respectively close to left sides of the antenna elements ANT in the columns 1 to 4, and the feeding points FP of the antenna elements ANT in the columns 8 to 5 are respectively close to right sides of the antenna elements ANT in the columns 8 to 5. By analogy, each antenna array can have the same arrangement.

On the other hand, when the wireless communication device 100 needs to cover 45 degrees in the horizontal direction, 8 users exist, and the antenna gain needs to be more than or equal to 15 dB, the antenna arrays of the above-mentioned FIG. 6 and FIG. 7 can be used simultaneously, and the multi-branch circuit shown in FIG. 5 is used in each antenna array. By this, 4 beams can be generated in the horizontal and the vertical polarization directions to generate 8 beams, where the beamwidth of each beam is about 11 degrees and the antenna gain of each antenna array is about 15 dB. In addition, the cross polarization between the vertical polarization and the horizontal polarization of the wireless communication device 100 can be more than 25 dB. In this way, the effects of narrow beamwidth, low sidelobe interference, low power consumption and low cost can be achieved at the same time.

Figure 8:
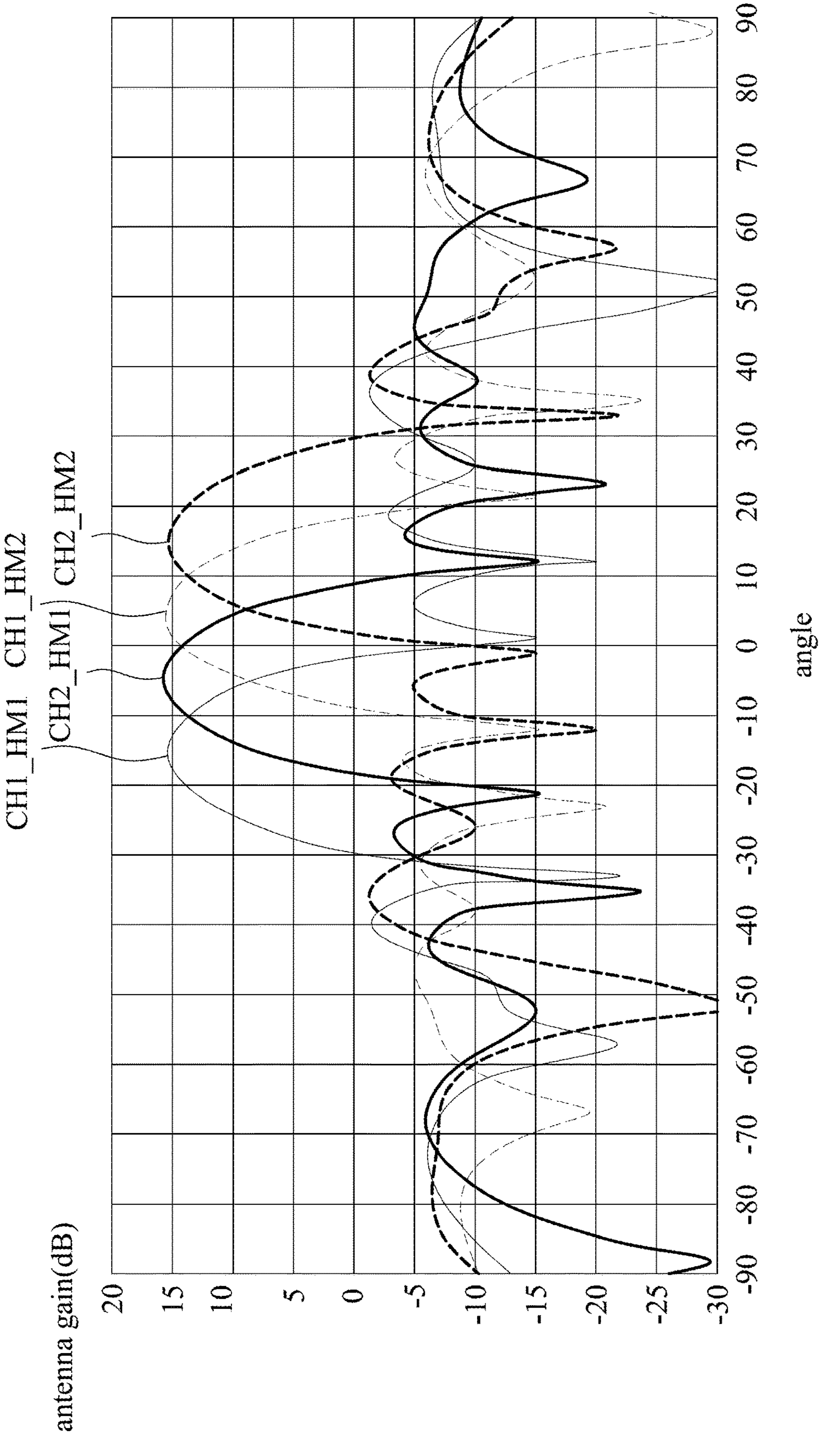
FIG. 8 is antenna gain of the wireless communication device for the horizontal polarization according to some embodiments of the present disclosure.

Reference is made to FIG. 8, and FIG. 8 is antenna gain of the wireless communication device 100 for the horizontal polarization according to some embodiments of the present disclosure. As shown in FIG. 8, the curve CH1_HM1 is the antenna gain of the antenna element ANT in the rows 3 to 4 in FIG. 7, the curve CH1_HM2 is the antenna gain of the antenna element ANT in the rows 5 to 6 in FIG. 7, The curve CH2_HM1 is the antenna gain of the antenna element ANT in the rows 1 to 2 in FIG. 7, and the curve CH2_HM2 is the antenna gain of the antenna element ANT in the rows 7 to 8 in FIG. 7.

It can be known from FIG. 8, the antenna gain of each antenna array is also about 15 dB, and the beam directions of the horizontal polarization of each antenna array are also −16 degrees, −5 degrees, 5 degrees, and 16 degrees, respectively, and the power difference between the sidelobe and the main beam is also more than 18 dB.

Figure 9:
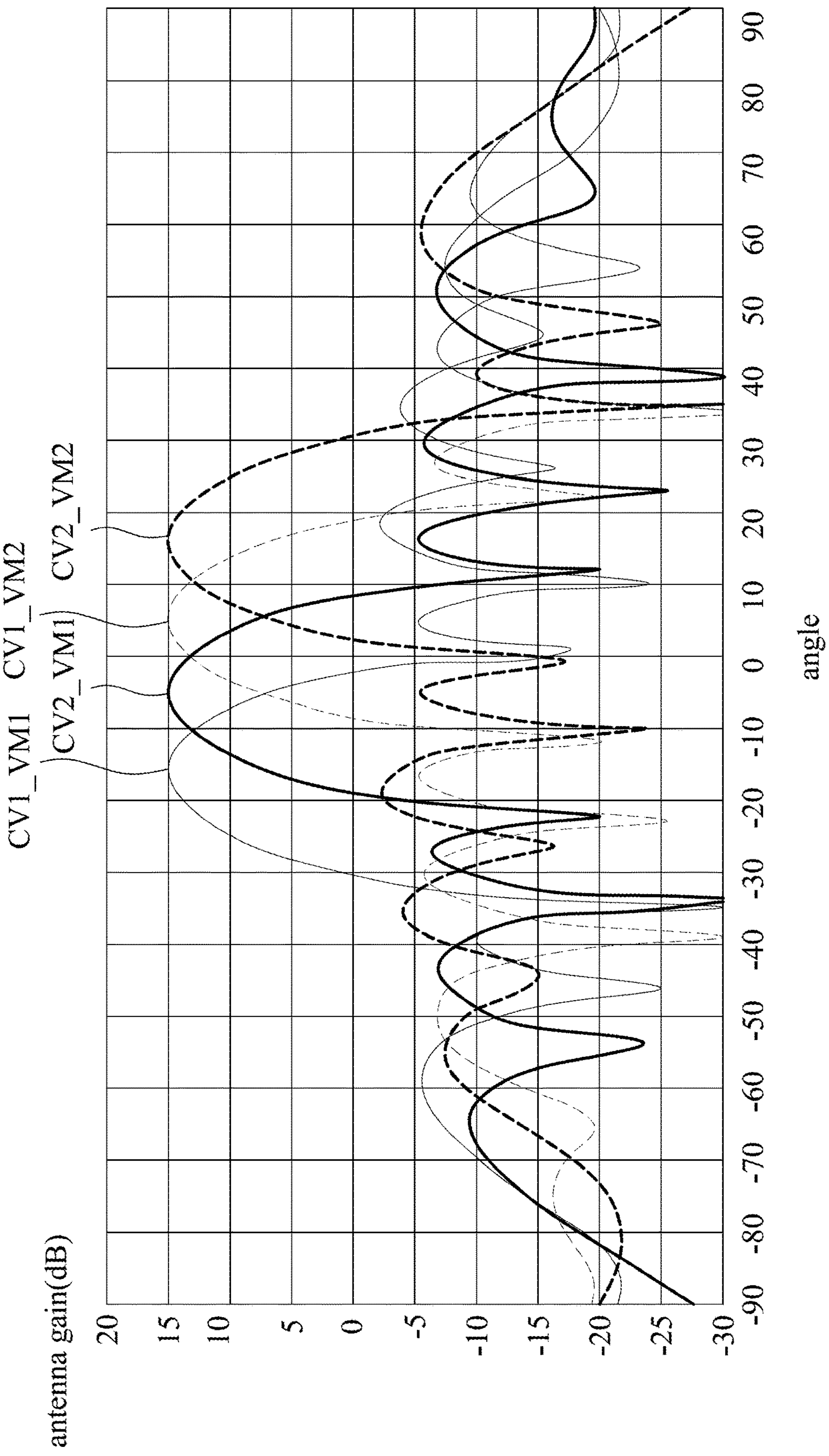
FIG. 9 is antenna gain of the wireless communication device for the vertical polarization according to some embodiments of the present disclosure.

Reference is made to FIG. 9, and FIG. 9 antenna gain of the wireless communication device 100 for the vertical polarization according to some embodiments of the present disclosure. As shown in FIG. 9, the curve CH1_VM1 is the antenna gain of the antenna element ANT in the rows 3 to 4 in FIG. 6, the curve CH1_VM2 is the antenna gain of the antenna element ANT in the rows 5 to 6 in FIG. 6, the curve CH2_VM1 is the antenna gain of the antenna element ANT in the rows 1 to 2 in FIG. 6, and the curve CH2_VM2 is the antenna gain of the antenna element ANT in the rows 7 to 8 in FIG. 6.

It can be known from FIG. 9, the antenna gain of each antenna array is about 15 dB, and the beam directions of the vertical polarization of each antenna array are −16 degrees, −5 degrees, 5 degrees and 16 degrees, respectively, and the power difference between the sidelobe and the main beam is more than 18 dB.

In summary, the wireless communication device of the present disclosure can utilize the length difference between the path lengths of the feeding branches of two adjacent antenna elements in the horizontal direction for controlling the beam angle of the antenna elements, and reduce the beamwidth by using a large quantity of the antenna elements. In addition, the power ratios between the branch nodes of the multi-branch circuit with multiple stages can be adjusted to control the antenna gain of the antenna elements, thereby reducing sidelobe interference. On the other hand, such the arrangement also greatly reduces power consumption and cost.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An antenna structure, comprising:

a substrate comprising a first surface and a second surface;

a ground layer, disposed between the first surface and the second surface;

a multi-branch circuit, disposed on the first surface, wherein the multi-branch circuit comprises a signal feeding terminal and a plurality of signal output terminals, wherein a plurality of feeding branches are formed between the signal feeding terminal and the plurality of signal output terminals; and a plurality of antenna elements, disposed on the second surface, wherein the plurality of antenna elements are connected to the plurality of signal output terminals through respective via holes, and are configured for beamforming, wherein a length difference between path lengths of the feed branches of two adjacent antenna elements in a horizontal direction is configured for controlling a beam angle of the plurality of antenna elements, wherein an antenna distance between geometric center positions of the adjacent two of the plurality of antenna elements in the horizontal direction is one-half wavelength of a center frequency of a resonant frequency band of the plurality of antenna elements, wherein the path lengths of the plurality of feeding branches form an arithmetic sequence, wherein the beam angle is obtained by following formula:

$$\Delta L = d \times \sin\theta,$$

wherein ΔL is the length difference, and d is the antenna distance, and θ is the beam angle.

2. The antenna structure of claim 1, wherein the multi-branch circuit has a plurality of branch nodes of a plurality of stages to form the plurality of feeding branches between the signal feeding terminal and the plurality of signal output terminals.

3. The antenna structure of claim 2, wherein the plurality of stages comprise a first stage, and the first stage is connected to the plurality of signal output terminals, wherein a path length difference between the two adjacent signal output terminals and the branch node in the first stage connected to the two adjacent signal output terminals is equal to the length difference.

4. The antenna structure of claim 3, wherein the plurality of stages further comprise a second stage, and the second stage is connected to the first stage, wherein a path length difference between the two adjacent branch nodes of the first stage and the branch node in the second stage connected to the two adjacent branch nodes of the first stage is equal to double the length difference.

5. The antenna structure of claim 4, wherein the plurality of stages further comprise a third stage, and the third stage is connected between the second stage and the signal feeding terminal, wherein a path length difference between the two adjacent branch nodes of the second stage and the branch node in the third stage connected to the two adjacent branch nodes of the second stage is equal to four times the length difference.

6. The antenna structure of claim 1, wherein the multi-branch circuit has a plurality of branch nodes, and the plurality of branch nodes are a plurality of unequal Wilkinson power dividers, and the plurality of unequal Wilkinson power dividers are configured for improving isolation between the plurality of antenna elements to control antenna gain of the plurality of antenna elements, thereby reducing sidelobe interference.

7. The antenna structure of claim 6, wherein the plurality of unequal Wilkinson power dividers are further configured for controlling a plurality of power ratios between the plurality of antenna elements to control the antenna gain of the plurality of antenna elements.

8. The antenna structure of claim 1, wherein a phase difference between the two adjacent antenna elements in the horizontal direction is proportional to the length difference.

9. The antenna structure of claim 1, wherein the beam angle of the plurality of antenna elements are proportional to the length difference.

10. The antenna structure of claim 1, wherein the plurality of antenna elements are arranged in rows and columns, when each of the plurality of antenna elements is a vertically polarized patch antenna, the plurality of antenna elements are disposed on the second surface in a horizontal mirror plane from one of the rows to another one of the rows, and when each of the plurality of antenna elements is a horizontally polarized patch antenna, the plurality of antenna elements are disposed on the second surface in a vertical mirror plane from one of the columns to another one of the columns.

11. A wireless communication device, comprising:

a plurality of antenna arrays, wherein each of the plurality of antenna arrays comprises:

a substrate comprising a first surface and a second surface;

a ground layer, disposed between the first surface and the second surface;

a multi-branch circuit, disposed on the first surface, wherein the multi-branch circuit comprises a signal feeding terminal and a plurality of signal output terminals, wherein a plurality of feeding branches are formed between the signal feeding terminal and the plurality of signal output terminals; and a plurality of antenna elements, disposed on the second surface, wherein the antenna elements are connected to the plurality of signal output terminals through respective via holes, and are configured for beamforming, wherein a length difference between path lengths of the feed branches of two adjacent antenna elements in a horizontal direction is configured for controlling a beam angle of the plurality of antenna elements, wherein an antenna distance between geometric center positions of the adjacent two of the plurality of antenna elements in the horizontal direction is one-half wavelength of a center frequency of a resonant frequency band of the plurality of antenna elements, wherein the path lengths of the plurality of feeding branches form an arithmetic sequence, wherein the beam angle is obtained by following formula:

$$\Delta L = d \times \sin\theta,$$

wherein ΔL is the length difference, and d is the antenna distance, and θ is the beam angle.

12. The wireless communication device of claim 11, wherein, for the each of the plurality of antenna arrays, the multi-branch circuit has a plurality of branch nodes of a plurality of stages to form the plurality of feeding branches between the signal feeding terminal and the plurality of signal output terminals.

13. The wireless communication device of claim 12, wherein, for the each of the plurality of antenna arrays, the plurality of stages comprise a first stage, and the first stage is connected to the plurality of signal output terminals, wherein for the each of the plurality of antenna arrays, a path length difference between the two adjacent signal output terminals and the branch node in the first stage connected to the two adjacent signal output terminals is equal to the length difference.

14. The wireless communication device of claim 13, wherein, for the each of the plurality of antenna arrays, the plurality of stages further comprise a second stage, and the second stage is connected to the first stage, wherein for the each of the plurality of antenna arrays, a path length difference between the two adjacent branch nodes of the first stage and the branch node in the second stage connected to the two adjacent branch nodes of the first stage is equal to double the length difference.

15. The wireless communication device of claim 14, wherein, for the each of the plurality of antenna arrays, the plurality of stages further comprise a third stage, and the third stage is connected between the second stage and the signal feeding terminal, wherein for the each of the plurality of antenna arrays, a path length difference between the two adjacent branch nodes of the second stage and the branch node in the third stage connected to the two adjacent branch nodes of the second stage is equal to four times the length difference.

16. The wireless communication device of claim 11, wherein, for the each of the plurality of antenna arrays, the multi-branch circuit has a plurality of branch nodes, and the plurality of branch nodes are a plurality of unequal Wilkinson power dividers, and the plurality of unequal Wilkinson power dividers are configured for improving isolation between the plurality of antenna elements to control antenna gain of the plurality of antenna elements, thereby reducing sidelobe interference.

17. The wireless communication device of claim 16, wherein, for the each of the plurality of antenna arrays, the plurality of unequal Wilkinson power dividers are further configured for controlling a plurality of power ratios between the plurality of antenna elements to control the antenna gain of the plurality of antenna elements.

18. The wireless communication device of claim 11, wherein, for the each of the plurality of antenna arrays, a phase difference between the two adjacent antenna elements in the horizontal direction is proportional to the length difference.

19. The wireless communication device of claim 11, wherein in each of the plurality of antenna arrays, the plurality of antenna elements are arranged in rows and columns, when the each of the plurality of antenna arrays is a vertically polarized patch antenna array, for the each of the plurality of antenna arrays, the plurality of antenna elements are disposed on the second surface in horizontal mirror plane from one of the rows to another one of the rows, and when the each of the plurality of antenna arrays is a horizontally polarized patch antenna array, for each of the plurality of antenna arrays, the plurality of antenna elements are disposed on the second surface in vertical mirror plane from one of the columns to another one of the columns.

* * * * *